Sept. 15, 1964     H. GOLDE     3,148,913
MANUALLY OPERABLE DEVICE FOR OPERATING
A SLIDING ROOF
Filed Dec. 21, 1962

United States Patent Office 3,148,913
Patented Sept. 15, 1964

3,148,913
MANUALLY OPERABLE DEVICE FOR
OPERATING A SLIDING ROOF
Hans Golde, 338 Hanauer Landstrasse,
Frankfurt am Main, Germany
Filed Dec. 21, 1962, Ser. No. 246,571
Claims priority, application Germany Dec. 30, 1961
2 Claims. (Cl. 296—137)

This invention relates to a sliding roof for a motor vehicle and more particularly a manually operable device for the sliding roof. The invention contemplates a device comprising a hand crank connected to a shaft which is rotatably mounted on the fixed portion of the vehicle roof for rotating a pinion or driving wheel engaging a cable or a chain or the like for transmitting a driving force to the sliding roof.

It is an object of this invention to provide a device as afore-mentioned having a hand crank which is mounted to avoid any danger of injury to the passengers of the vehicle.

It is another object to provide a hank crank which may be swung from an inoperative to an operative position and which is readily accessible when in its inoperative position.

A further object of the invention is to provide a hand crank of sufficient length for easy operation but avoiding any danger or colliding with commonly used sun visors or other built-in parts of the vehicle roof.

According to the present invention there is provided a manually operable device for operating a sliding roof of a motor vehicle comprising a shaft mounted on the vehicle roof for rotation about its axis, a hub fixed to the lower end of said shaft, a hand crank connected to said hub for pivotal movement from an upper inoperative position to a lower operative position, the axis of said pivotal movement being horizontal and laterally spaced from said lower end and at right angles to said hand crank, means limiting said pivotal movement to an amount of 45° or less, said hand crank being shaped to provide an upwardly extending inner portion and a downwardly extending outer portion, when in its inoperative position.

Figure 1:
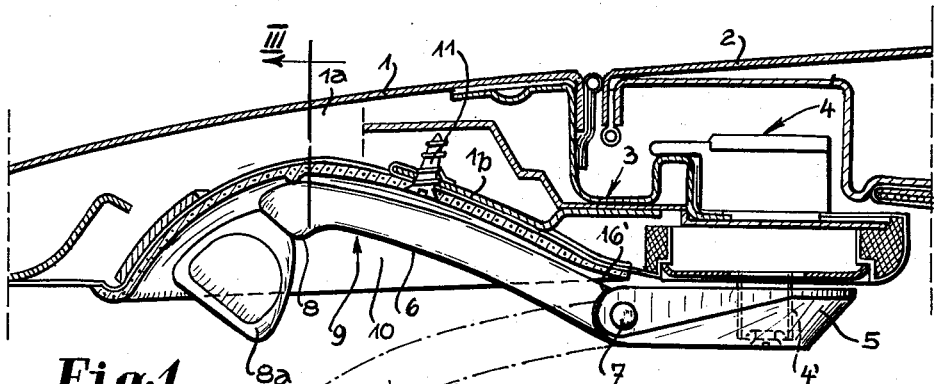
Figure 3:
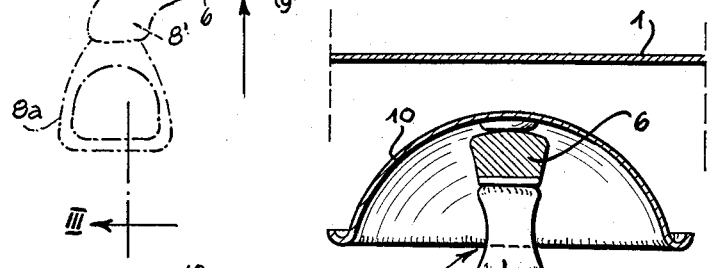
Figure 2:
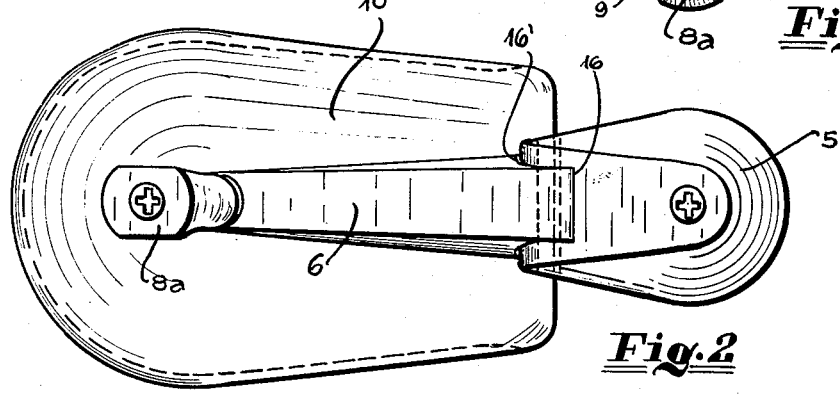
Figure 4:
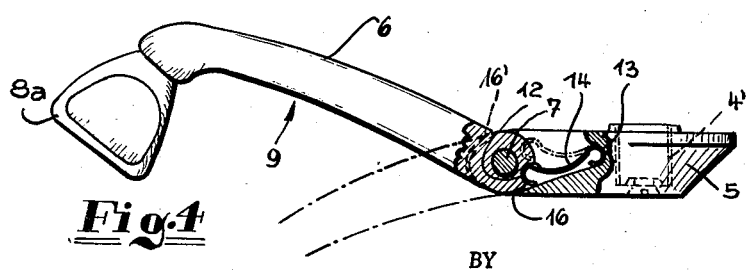

A preferred embodiment of the invention will be described hereinafter with reference to the accompanying drawings, wherein:

FIG. 1 is a fragmentary side view of the vehicle roof partly in section along the longitudinal center plane of the vehicle, showing an operating device according to the invention, FIG. 2 is a bottom plan view of the operating device according to FIG. 1, FIG. 3 is a sectional view taken along line III—III of FIG. 1, and FIG. 4 is a side view of parts as shown in FIG. 1 partly in section.

FIG. 1 shows a longitudinal section through the front portion of a fixed vehicle roof 1 and through a sliding roof consisting of a rigid sliding panel 2 shown in its closed position. A commonly used front brace or frame member 3 is rigidly attached to the fixed roof 1 carrying driving means shown diagrammatically and generally designated 4 and comprising a vertical pin or shaft having a lower end 4' to be connected to rotating means which will be more fully described hereinafter.

A hand crank 9 is provided for actuating the driving means. As will be seen especially from FIG. 1, a hub 5 is provided with an inner bore receiving the lower shaft end 4'. The hub is rigidly connected to the shaft below the fixed roof portion by any suitable means, as for example screw means, as shown.

A horizontal pin 7 is mounted on the hub 5 in a position spaced laterally from the end 4' of the vertical shaft. Hand crank 9 is mounted on pin 7 for pivotal movement in a vertical plane from an upper inoperative position to a lower operative position and for rotating shaft 4' when in its lower position. It will be seen from the drawing that the hand crank 9 extends at right angles with regard to pin 7.

The hand crank is shown in its inoperative upper or rest position in full lines in FIG. 1, and it will be noted that the hand crank is shaped to provide an upwardly extending inner portion or first section 6 and downwardly extending outer portion or second section 8 rigidly connected to section 6 in angular disposition thereto. Preferably the outer end portion of the outer portion 8 is constituted by a hand grip part 8a which is rotatably mounted with regard to the remainder of hand crank 9.

The pivotal movement of hand crank 9 from its inoperative position to its operative or active position 9' indicated in dotted lines in FIGS. 1 and 4 is restricted to an angle of 45° or less. For restricting the angle of pivotal movement any suitable abutment means may be provided, such means being indicated as abutting surfaces or portions 16 and 16', respectively, provided on the hub 5 on the one hand and on the crank portion on the other hand (FIG. 2). Moreover, suitable spring means are provided for retaining the hand crank 9 in its operative or inoperative position, respectively. Any common type of spring means may be used for this purpose, but a preferred embodiment is shown in FIG. 4, wherein a leaf spring 14 extends between a recess 13 provided in the hub 5 and another recess 12 provided in the hand crank 9 opposite recess 13 with the hand crank in its neutral position. Due to its arrangement, the preloaded leaf spring 14 tends to urge and to hold the crank in either its operative or its inoperative position.

As a result of the curved or angular shape provided by parts 6 and 8 of the hand crank 9 and also as a result of its being mounted on pin 7 spaced laterally from shaft 4', the hand crank 9 does not require much room when in its inoperative position since a comparatively small recess at one side only of the driving device 4 and spaced therefrom is sufficient to receive the crank to substantially conceal the same and avoid its projecting into the passenger compartment. Adequate room for this recess will always be available underneath the respective portion of the fixed vehicle roof 1.

A one-piece oblong trough 10, preferably made from plastic, is fixed by screw means 11 to the lower surface of the recess. It will be appreciated that the oblong trough 10 or recess, respectively, extends radially with respect to the crank shaft 4' so that the correct angular position of the hand crank 9, when in its inoperative position, i.e. when the sliding room 2 is closed, is indicated by the position of the trough 10, which trough may be dimensioned with more or less width as may be desired for designating the final position of the crank or with regard to the space available underneath the fixed roof 1. Moreover, by pivoting hand crank 9 upwardly into the trough 10, hand crank 9 becomes blocked against any inadvertent substantial rotation thereof.

As will be seen especially from FIG. 1, the hand grip part 8a of the hand crank is spaced a considerable distance from its crank axis 4', thereby facilitating actuation by the operator because a rather elongated crank arm is available when the hand crank is in its operative position. A further advantage is that in the operative position there is sufficient room left between the lower surface of the fixed roof portion and the path of rotary movement of the hand crank, thereby avoiding any danger of colliding with sun shields or other built-in parts which are or may also be fixed to the lower surface of the fixed room and permitting free and unlimited rotation of shaft 4, for example, in excess of 360°.

What I claim is:

1. A device for manually operating a sliding roof which is slidably supported on a fixed roof portion of a vehicle, said device comprising a vertical shaft rotatably mounted on said fixed roof portion and adapted for being rotated in excess of 360° to displace said sliding roof, a hub on said shaft below the fixed roof portion, a horizontal pin on said hub and spaced from said shaft, a handcrank including a first section pivoted to said pin and a second section rigidly connected to the first section in angular disposition thereto, said first section and hub including abutting portions limiting movement of said handcrank on said pin to an angle of less than 45° between an active position and a rest position for the handcrank, spring means associated with said handcrank to hold and urge said handcrank in either of said positions said fixed roof portion being provided with a recess accommodating the handcrank with the latter in said position of rest for substantially concealing the same and preventing substantial rotation of the handcrank about a vertical axis of rotation defined by said shaft, and a handgrip rotatably mounted on the second section of said handcrank for rotation about an axis which is parallel to said shaft with the handcrank in said active position.

2. A device as claimed in claim 1 comprising an oblong trough fixed in said fixed roof portion to define said recess and radially disposed with respect to said shaft.

References Cited in the file of this patent

UNITED STATES PATENTS

| | | |
|---|---|---|
| 1,684,499 | Mayer | Sept. 18, 1928 |
| 2,164,150 | Breuster | June 27, 1939 |

FOREIGN PATENTS

| | | |
|---|---|---|
| 141,190 | Switzerland | Sept. 16, 1930 |
| 820,352 | Great Britain | Sept. 16, 1959 |